(12) United States Patent
Hassid

(10) Patent No.: US 7,947,144 B1
(45) Date of Patent: May 24, 2011

(54) PAPER ATTACHMENT METHOD

(76) Inventor: Gilbert F. Hassid, Miami Beach, FL (US)

( * ) Notice: Subject to any disclaimer, the term of this patent is extended or adjusted under 35 U.S.C. 154(b) by 749 days.

(21) Appl. No.: 11/821,494

(22) Filed: Jun. 25, 2007

(51) Int. Cl.
*B29C 65/00* (2006.01)
*B32B 37/00* (2006.01)
*B32B 37/12* (2006.01)
*B32B 37/18* (2006.01)

(52) U.S. Cl. ....... 156/249; 156/289; 156/291; 428/40.1; 428/41.8

(58) Field of Classification Search .................. 156/249, 156/344, 152, 230, 239, 241, 289, 290, 291, 156/297, 299, 300; 428/40.1, 41.8, 192
See application file for complete search history.

(56) References Cited

U.S. PATENT DOCUMENTS

| | | | |
|---|---|---|---|
| 3,691,140 A | 9/1972 | Slvor | |
| 4,447,481 A | 5/1984 | Holmberg et al. | |
| 4,979,237 A | 12/1990 | Hazar et al. | |
| 4,980,212 A | 12/1990 | Marquis et al. | |
| 5,413,381 A | 5/1995 | Beeuwkes, III et al. | |
| 5,716,685 A | 2/1998 | Kumar et al. | |
| 5,967,555 A | 10/1999 | Samelian | |
| 6,071,584 A | 6/2000 | Ritter | |
| 6,153,278 A | 11/2000 | Timmerman et al. | |
| 6,159,497 A * | 12/2000 | LaPrade et al. ............... 424/448 |
| 6,544,640 B1 | 4/2003 | Miles et al. | |
| 6,703,096 B2 | 3/2004 | Sabella | |
| 7,037,564 B1 | 5/2006 | Abron | |

* cited by examiner

*Primary Examiner* — Mark A Osele
*Assistant Examiner* — Nickolas Harm

(57) ABSTRACT

A paper attachment system and method includes providing a plurality of flexible panels. Each of the flexible panels has a first side, a second side and a peripheral edge. A plurality of adhesive patches is provided. Each of the panels has one of the adhesive patches attached thereto. The adhesive patches are positioned on the first sides of the panels. A plurality of coverings is provided. Each of the coverings is positioned on and removably attached to one of the adhesive patches so that each of the adhesive patches is covered by one of the coverings. A plurality of the panels is positioned on top of each other to define a stack of the panels. The coverings are then removed from the stack of the panels. Pressure is then applied to the stack of panels to releasably secure the panels together with the adhesive patches.

5 Claims, 3 Drawing Sheets

PAPER ATTACHMENT METHOD

BACKGROUND OF THE INVENTION

1. Field of the Invention

The present invention relates to paper attaching devices and more particularly pertains to a new paper attaching device for attaching together a plurality of pieces of paper or panels with a pressure sensitive adhesive.

2. Description of the Prior Art

The use of paper attaching devices is known in the prior art. While these devices fulfill their respective, particular objectives and requirements, the need remains for a system that allows pieces of paper to be attached together without paper clips or staples. Staples have the disadvantage of not allowing attached pieces of paper to be easily removed from each other or allow additional pieces of paper to be attached to the papers already attached together. Paper clips have the disadvantage of allowing pieces of paper to fall away from each other. For the above reasons, the need exists for an easy to use system that allows pieces of paper to be attached together in such a manner that allows their easy removal from each other while still preventing individual pieces of paper to fall away. This system should further allow additional pieces of paper, or other articles, to be added to a group of attached papers. This would permit a person with a contract or other large grouping of papers to attach additional documents or payments to the grouping of papers.

SUMMARY OF THE INVENTION

The present invention meets the needs presented above by generally providing a plurality of flexible panels. Each of the flexible panels has a first side, a second side and a peripheral edge. A plurality of adhesive patches is provided and each comprises a pressure sensitive adhesive. Each of the panels has one of the adhesive patches attached thereto. The adhesive patches are positioned on the first sides of the panels. A plurality of coverings is provided and each comprises a flexible non-stick material. Each of the coverings is positioned on and removably attached to one of the adhesive patches so that each of the adhesive patches is covered by one of the coverings. A plurality of the panels is positioned on top of each other to define a stack of the panels. The coverings are then removed from the stack of the panels. Pressure is then applied to the stack of panels to releasably secure the panels together with the adhesive patches.

The present invention further meets the needs presented above by generally comprising a flexible panel that has a first side, a second side and a peripheral edge. An adhesive patch comprising a pressure sensitive adhesive is attached to the panel and is positioned adjacent to the peripheral edge. A covering comprising a flexible non-stick material is positioned on and removably attached to the adhesive patch so that the adhesive patch is covered by the covering. The covering includes a tab portion free of the adhesive patch. The tab portion extends beyond the peripheral edge of the panel to facilitate gripping of the covering. The covering may be removed to allow an article to be attached to the panel with the adhesive patch.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
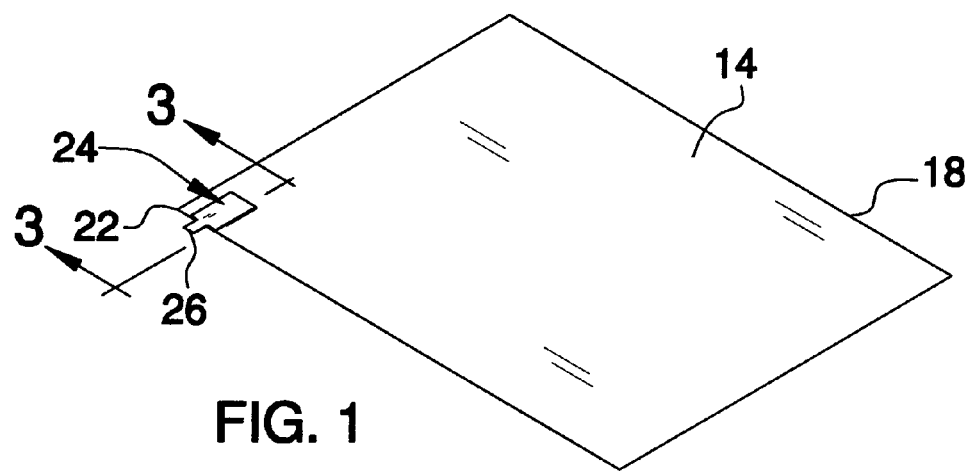
FIG. 1 is a perspective view of a paper attachment system and method according to the present invention.
Figure 2:
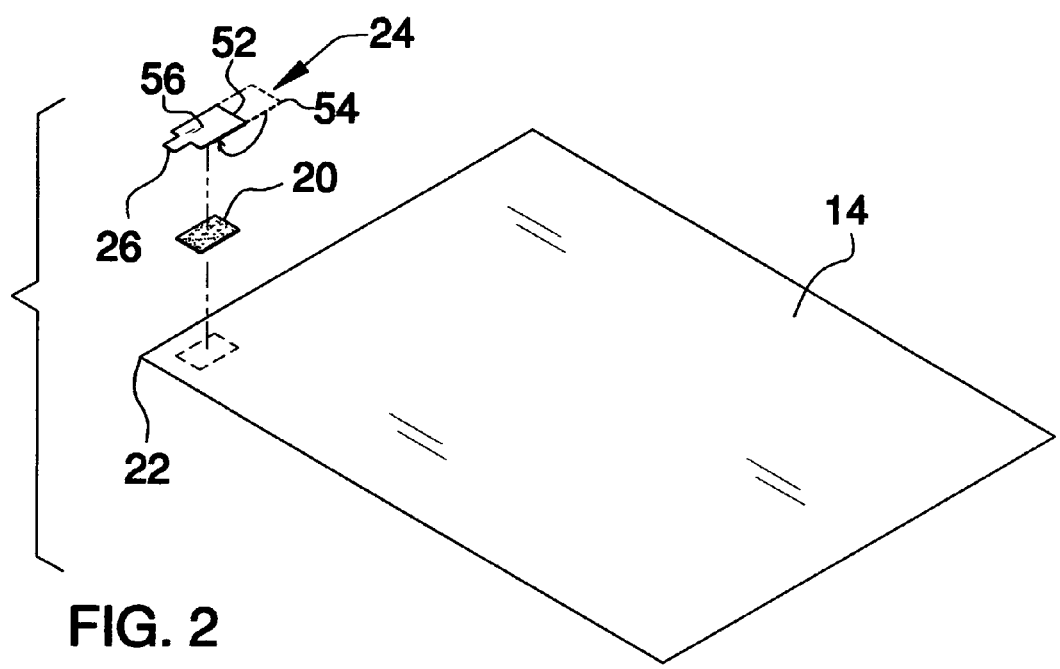
FIG. 2 is an expanded perspective view of the present invention.
Figure 3:
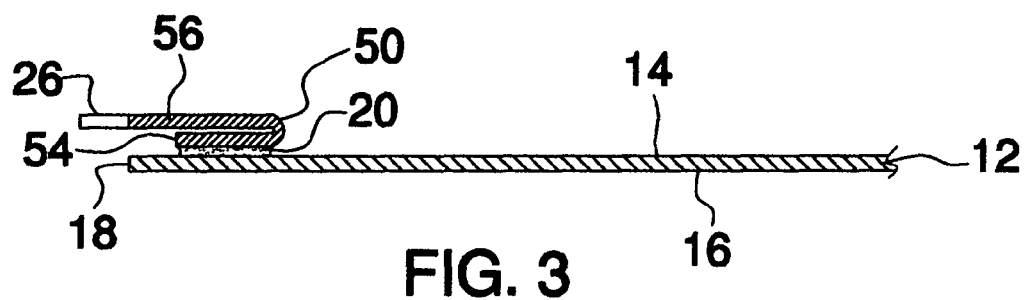
FIG. 3 is a cross-sectional view taken along line 3-3 of FIG. 1 of the present invention.

With reference now to the drawings, and in particular to FIGS. 1 through 6 thereof, a new paper attaching device embodying the principles and concepts of the present invention and generally designated by the reference numeral 10 will be described.

As best illustrated in FIGS. 1 through 4, the paper attachment system and method 10 generally comprises providing a plurality of flexible panels 12. Each of the flexible panels 12 has a first side 14, a second side 16 and a peripheral edge 18. Each of the panels 12 has a same size and shape as each other. The panels 12 are comprised of a paper material and may comprise conventional sheets of paper, business cards, checks and the like. Other panels 12 may be utilized having different sizes or different materials.

A plurality of adhesive patches 20 is also provided. Each of the adhesive patches 20 comprises a pressure sensitive adhesive. The panels 12 each have one of the adhesive patches 20 attached thereto. The adhesive patches 20 are positioned on the first sides 14 of the panels 12. The adhesive patches 20 are aligned with each other when the panels 12 are aligned with each other. The adhesive patches 20 may be positioned adjacent to an upper left hand corner 22 of the panels 12.

A plurality of coverings 24 is provided. Each of the coverings 24 comprises a flexible non-stick material, such as a plastic. Each of the coverings 24 is positioned on and removably attached to one of the adhesive patches 20 so that each of the adhesive patches 20 is covered by one of the coverings 24. The coverings 24 each include a tab portion 26 and a primary portion 50. The tab portions 26 are free of the adhesive patches 20 and extend beyond the peripheral edge 18 of the panels to facilitate gripping of the coverings. The primary portions 50 are folded along a fold line 52 into a first section 54 and a second section 56. The first sections 54 are positioned on and removably secured to the adhesive patches 20. The tab portions 26 are attached to second sections 56 and are distal with respect to the fold lines 52. When the panels 12 are stacked on top of each other, the second sections 56 allow easier removal of the primary portions 50 of the coverings 24. It should be understood that in this embodiment, the adhesive patches 20 and the coverings 24 would generally be positioned on the panels 12 by a paper manufacturer and pre-packaged as such.

Figure 4:
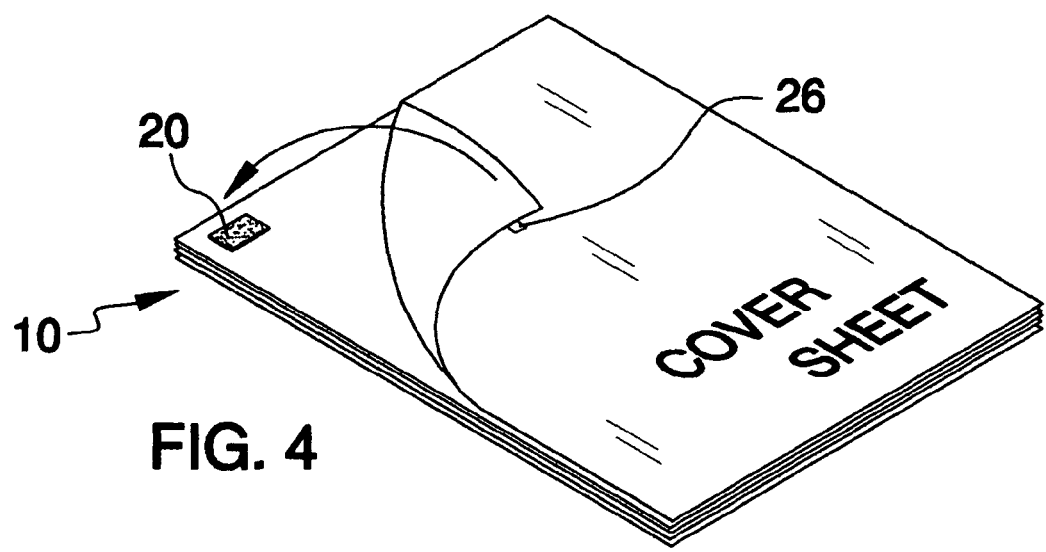
FIG. 4 is a perspective view of the present invention.

In use, a plurality of the panels 12 is positioned on top of each other to define a stack of the panels as shown in FIG. 4. The coverings 24 are removed from the stack of the panels 12. Pressure is then applied to the panels 12, particularly where the adhesive panels 20 are aligned with each other, to releasably secure the panels 12 together with the adhesive patches 20. The tabs 26 allow all of the coverings 24 to be removed simultaneously. Where the panels 12 are business cards, checks or other similar items, the adhesive patches 20 can be used to attach the panels to other pieces of paper, a folder or to an item.

The panels 12 may be used singularly or used with other articles, such as note pages or checks, wherein the covering 24 is removed from the adhesive patch 20 and the article attached to the panel 12 with the adhesive 20 without the need of stables or paperclips.

Figure 5:
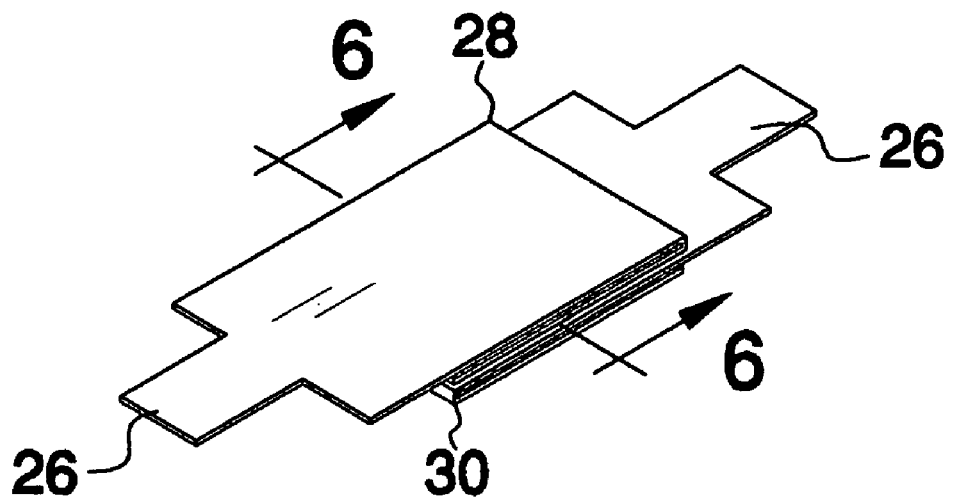
FIG. 5 is a perspective view of a second embodiment of the present invention.
Figure 6:
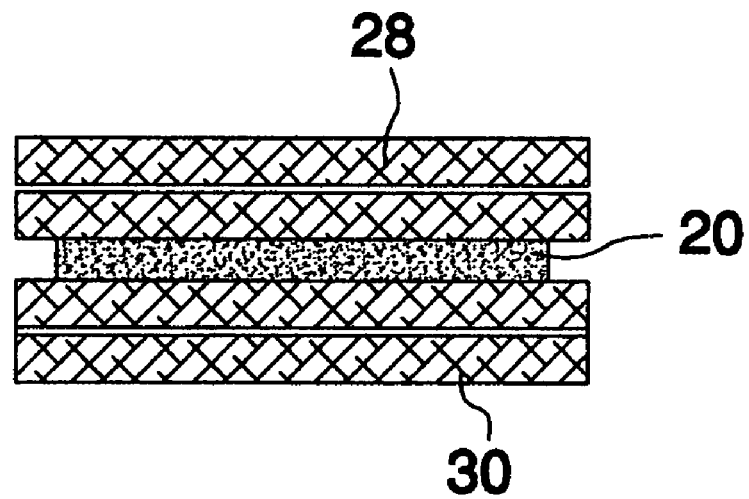
FIG. 6 is a cross-sectional view taken along line 6-6 of FIG. 5 of the present invention.

FIGS. 5 and 6 include a second embodiment which includes a pair of coverings 28, 30 positioned on either side of an adhesive patch 20. One of the coverings 28 may be removed and the adhesive patch 20 adhered to a panel 12 or any desired object. The other of the coverings 30 may then be removed to adhere another item to the panel 12 with the adhesive patch 20. The coverings 28, 30 of the second embodiment each include tabs 26 to allow their easy separation from the adhesive patch 20.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of attaching together pieces flexible panels, said method comprising the steps of:

providing a plurality of said flexible panels, each of said flexible panels having a first side, a second side and a peripheral edge, each first side of said panels having a left edge, a right edge, an upper edge and a lower edge such that an upper left hand corner is defined at an intersection of corresponding ones of said left and upper edges;

providing a plurality of adhesive patches, each of said adhesive patches comprising a pressure sensitive adhesive, each of said panels having one of said adhesive patches attached thereto, said adhesive patches being positioned on said first sides of said panels, said adhesive patches being positioned adjacent to an associated one of said upper left corners and extending less than one third of a distance from said left edges to corresponding ones of said right edges, said adhesive patches extending less than one-third of a distance from said top edges to a corresponding one of said bottom edges;

providing a plurality of coverings, each of said coverings comprising a flexible non-stick material, each of said coverings being positioned on and removably attached to one of said adhesive patches so that each of said adhesive patches is covered by one of said coverings, said coverings each including a tab portion free of a respective one of said adhesive patches, said tab portions extending beyond the peripheral edge of a respective one of said panels to facilitate gripping of the coverings and simultaneous removal of a plurality of said coverings;

positioning a plurality of said panels on top of each other to define a stack of said panels, simultaneously removing all of said coverings from said stack of said panels; and applying pressure to said stack of panels to releasably secure said panels together with said adhesive patches.

2. The method according to claim 1, wherein the step of providing a plurality of panels includes each of said panels being comprised of a paper material.

3. The method according to claim 1, wherein the step of providing said plurality of adhesive patches further includes said adhesive patches being aligned with each other when said panels are aligned with each other.

4. The method according to claim 1, wherein the step of providing a plurality of coverings further includes each of said coverings including one of said tab portions and a primary portion attached together, said primary portions being folded along a fold line into a first section and a second section, said first sections being positioned on and removably secured to an associated one of said adhesive patches, said tab portions being attached to a respective one of said second sections and are distal with respect to said fold lines.

5. A method of attaching together pieces flexible panels, said method comprising the steps of:

providing a plurality of said flexible panels, each of said flexible panels having a first side, a second side and a peripheral edge, each first side of said panels having a left edge, a right edge, an upper edge and a lower edge such that an upper left hand corner is defined at an intersection of corresponding ones of said left and upper edges;

providing a plurality of adhesive patches, each of said adhesive patches comprising a pressure sensitive adhesive, at least one of said panels having one of said adhesive patches attached thereto, said adhesive patches being positioned adjacent to an associated one of said upper left corners and extending less than one third of a distance from said left edges to corresponding ones of said right edges, said adhesive patches extending less than one-third of a distance from said top edges to a corresponding one of said bottom edges;

providing at least one covering, said at least one covering comprising a flexible non-stick material, said at least one covering being positioned on said adhesive patch of said at least one panel, said at least one covering including a tab portion and a primary portion, said tab portion being free of said adhesive patch, said tab portion extending beyond the peripheral edge of said at least one panel to facilitate gripping of the coverings to facilitate gripping of the coverings and simultaneous removal of a plurality of said coverings, said primary portion being folded along a fold line into a first section and a second section, said first section being positioned on and removably secured to said adhesive patch, said tab portion being attached to second section and being distal with respect to said fold line;

positioning a pair of said panels on top of each other to place said adhesive patch on said at least one panel between said at least one panel and another one of said panels;

removing said at least one covering; and applying pressure to said pair of panels to releasably secure said pair of panels together with said adhesive patch.

* * * * *